March 7, 1933. J. R. RIPPE 1,900,586
COOLING SYSTEM
Filed Nov. 7, 1930 3 Sheets-Sheet 1
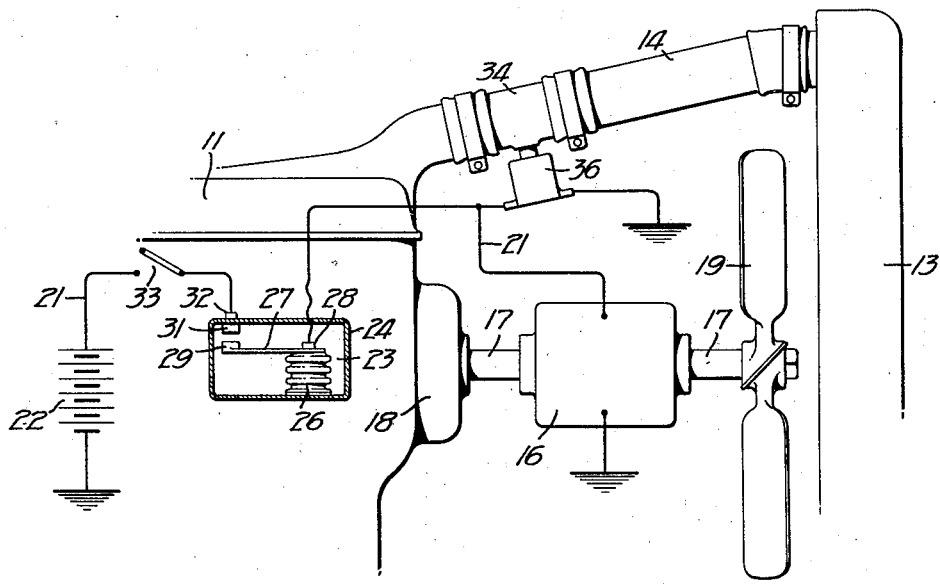
FIG_1_
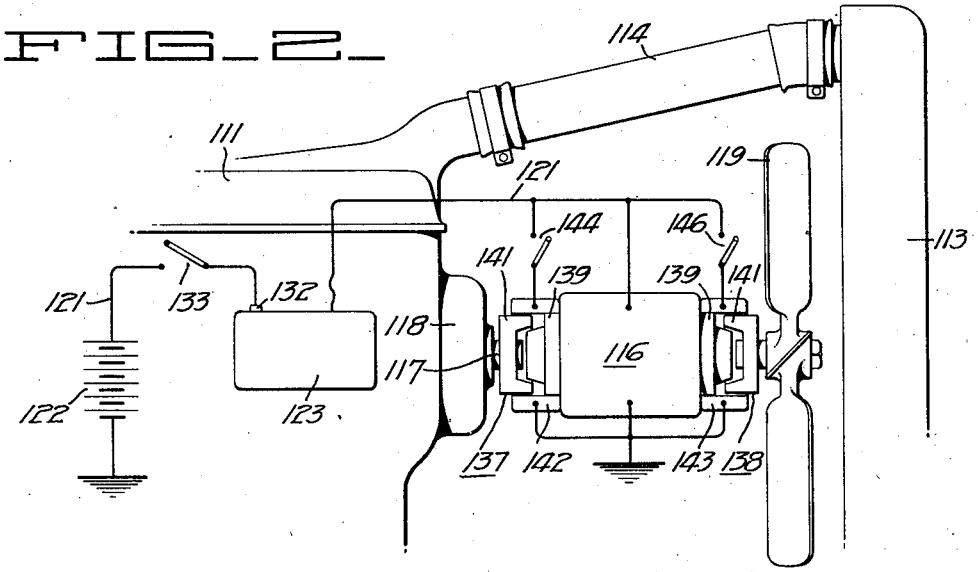
FIG_2_
INVENTOR.
John R. Rippe
BY
White, Prost. Hehr & Lothrop
ATTORNEYS.

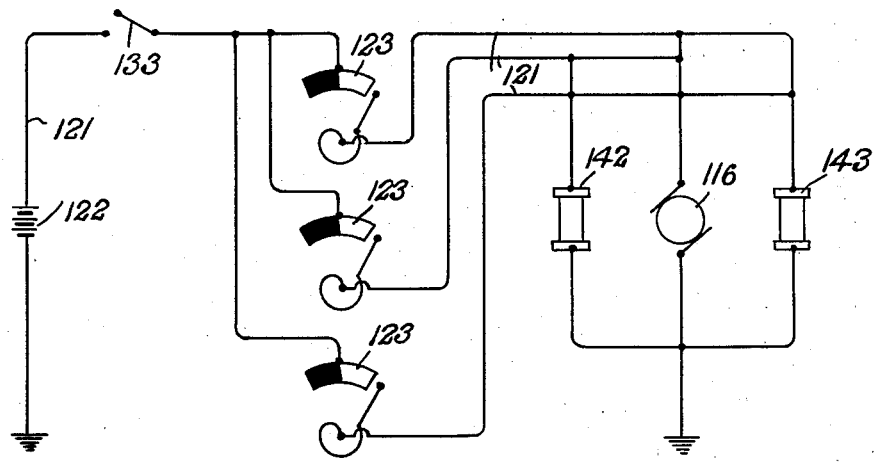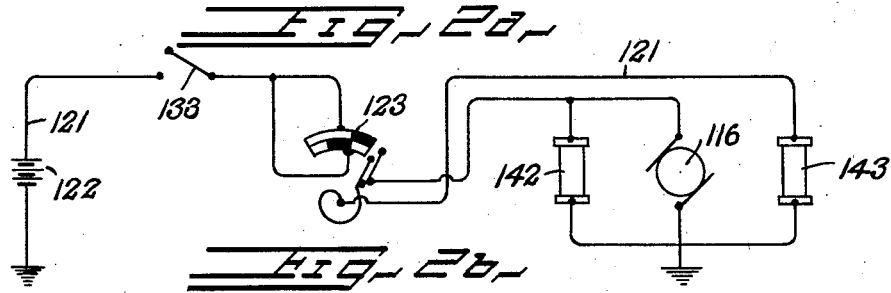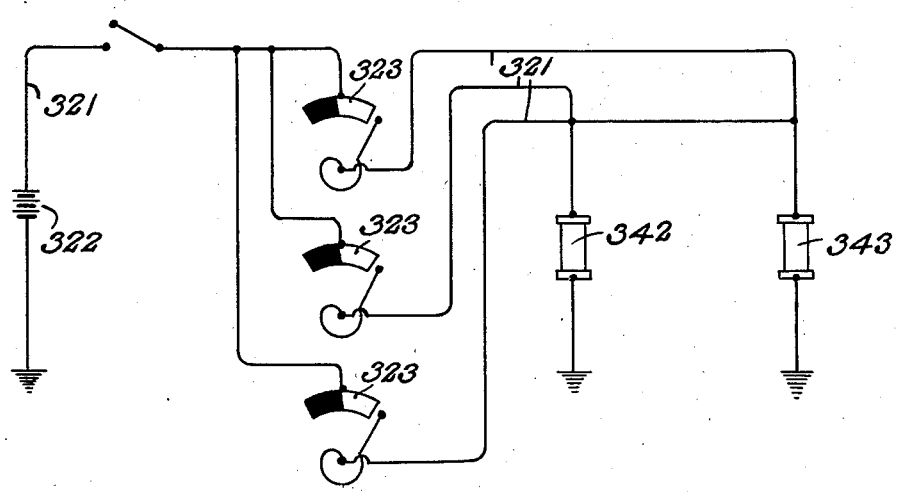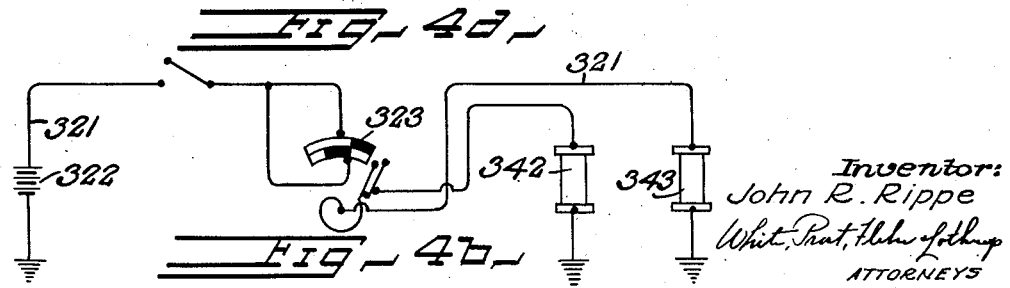

March 7, 1933.  J. R. RIPPE  1,900,586
COOLING SYSTEM
Filed Nov. 7, 1930  3 Sheets-Sheet 3
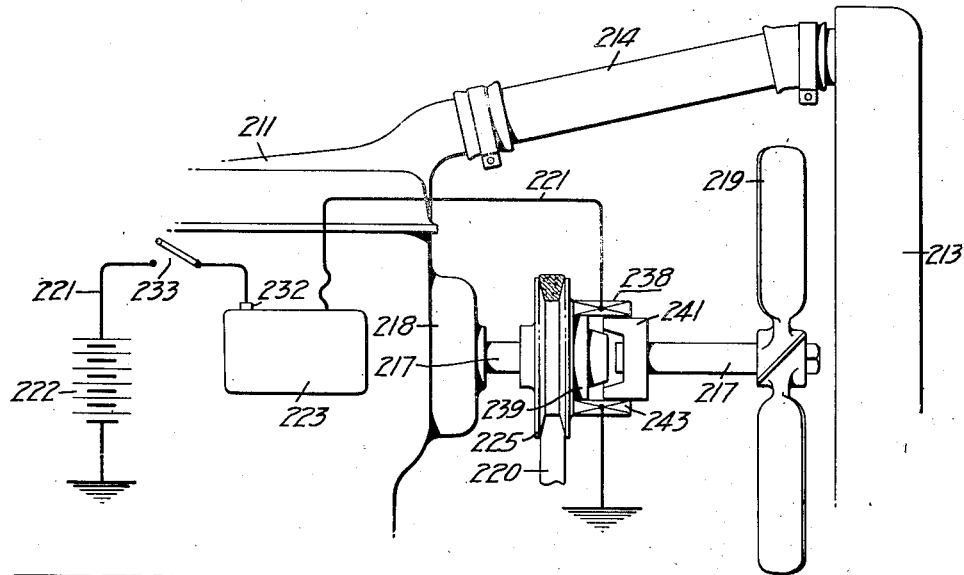
FIG_3_
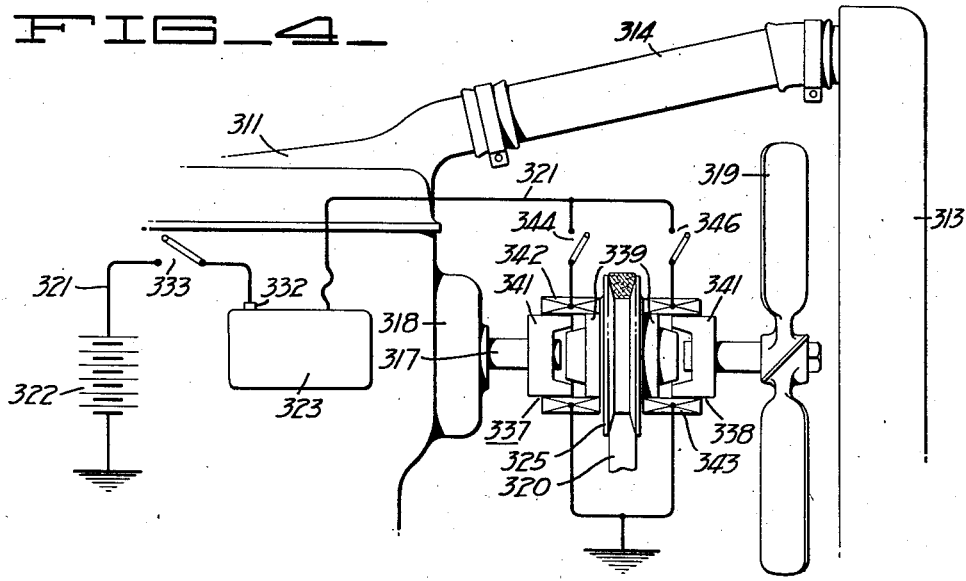
FIG_4_
INVENTOR.
John R. Rippe
BY
White, Prost, Flehr & Lothrop
ATTORNEYS.

Patented Mar. 7, 1933

1,900,586

UNITED STATES PATENT OFFICE

JOHN R. RIPPE, OF FRESNO, CALIFORNIA

COOLING SYSTEM

Application filed November 7, 1930. Serial No. 494,035.

My invention generally relates to means for maintaining the operating temperatures of internal combustion engines at predetermined values and more particularly relates to cooling systems for such engines.

Cooling systems commonly employed for internal combustion engines, in general, includes an engine driven fan for directing currents of air through a radiator and about the engine and also include an engine driven pump for circulating cooling water through jackets surrounding the cylinders of the engine and through the radiator. In the usual cooling system installation, the speeds of the fan and water pump are directly proportional to the engine speed and, as a result, during a part of the period of operation of the engine, such as when the engine is relatively cool, these units of the cooling system are being driven without beneficial result.

Broadly, it is an object of my invention to provide an improved cooling system for an internal combustion engine for maintaining an efficient operating temperature in the engine under all operating and weather conditions.

More specifically, it is an object of my invention to provide a cooling system which is responsive to variations in temperature of the engine in which it is employed.

It is a still further object of my invention to provide an internal combustion engine with a temperature responsive cooling system capable of maintaining the temperature of the engine substantially within a predetermined range.

Other objects of my invention together with some of its advantageous features will be set forth in the following description of the preferred embodiment of my invention which is illustrated in the drawings.

In the drawings:

Fig. 1 is a diagrammatic view illustrating an embodiment of my invention as applied to an internal combustion engine.

Fig. 2 is a diagrammatic view showing a modification of the embodiment of my invention which is illustrated in Fig. 1.

Fig. 3 is a diagrammatic view illustrating another modification of the embodiment of my invention which is shown in Fig. 1.

Fig. 4 is a diagrammatic view showing a modification of the embodiment of my invention which is shown in Fig. 2.

The cooling system of my invention is adapted for use with an automotive engine and, in its preferred form, preferably comprises means for directing currents of air through a radiator and about the engine, means for circulating cooling water about the engine together with means responsive to variations in the temperature of the engine for regulating the air directing and water circulating means.

In Fig. 1 I have illustrated an internal combustion engine 11 of the conventional construction which is provided with a radiator 13 connected to the engine to permit circulation of cooling water, one of the connections being a conduit 14 through which hot water passes from the engine to the radiator.

In accordance with my invention, I provide a suitably mounted electric motor 16 which is connected, by means of a shaft 17, to a conventional water pump 18 for circulating the cooling water, the pump conveniently being rigidly mounted on the engine. The motor 16 is connected also by means of the shaft 17, to a fan 19 for directing currents of air through the radiator and about the engine, the fan preferably being carried adjacent to the radiator 13 and on the side of the motor 16 opposite the pump 18. An electrical circuit, generally designated 21, connects the motor 16 to a suitable source of power, such as a battery 22, and, if desired, the battery 22 can be the battery usually employed in the engine ignition system.

Means are provided for regulating the operation of the motor 16 and preferably include a thermostat 23 which is mounted in a housing 24 carried upon the engine in the desired thermal relation thereto. The thermostat which I employ preferably comprises a metallic bellows 26 filled with a fluid such as mercury, so that the bellows expand and contract in accordance with predetermined temperature variations for efficient engine operation. A lever 27, formed of a suitable conductor of electric current, is secured to but insulated from the bellows 26, one extremity of the lever being provided with a binding post 28 which is connected into the motor side of the circuit 21 and the other, free extremity of the lever being furnished with a contact 29 for engagement with a contact 31 secured to but insulated from the housing 24. The contact 31 carries a binding post 32 which is connected into the battery side of the circuit 21. Expansion and contraction of the bellows 26, by reason of the variations in temperature of the engine, causes the lever 27 to make and break the circuit 21 thereby starting and stopping the motor 16. If desired, a switch 33, such as the ignition switch of the vehicle, can be connected into the circuit 21 so that, when the engine is stopped by actuation of the switch, the motor 16 likewise can be rendered inoperative.

The cooling system of my invention may, if desired, also include a valve 34 which is interposed in the conduit 14 to check the flow of water circulating therethrough and which is actuated by a solenoid 36. The valve 34 can be of the conventional type and normally is maintained in closed position against the tension of a suitable spring, not shown. The solenoid 36 is connected in the circuit 21 so that upon energization thereof, by action of the thermostat 23, the tension of the spring holding the valve in closed position is overcome and cooling water pumped by the pump 18 is permitted to pass through the conduit 14 into the radiator.

In operation, when the engine 11 is cold, the contacts 29 and 31 are open, the motor 16 is not energized and neither the pump 18 nor the fan 19 are driven. Further, if the valve 34 is included in the system, it is held in closed position. When the engine becomes heated to a predetermined temperature, the motor is energized by a closing of the circuit 21 under the action of the thermostat 23 and the pump 18 and the fan 19 revolve at a proper speed to maintain correct temperature of the engine, the valve 34, if it is incorporated in the system, being opened upon the energization of the solenoids 36 thereby permitting water to be circulated to the engine.

In the modification of the cooling system of my invention which I have shown in Fig. 2 as applied to an engine 111 provided with a radiator 113 and a conduit 114 connecting the radiator and the engine, in addition to a motor 116 which is connected, by means of a shaft 117 to a water pump 118 and a cooling fan 119 and which also is connected, through an electrical circuit 121 to a source of power, such as a battery 122, I provide a thermostat 123, similar to the thermostat 23. In this modification I also provide a switch 133, such as the ignition switch of the vehicle, for opening the circuit 121 when desired.

The thermostat 123 is adapted, upon variations in the temperature of the engine, to regulate not only the operation of the motor 116 but also to control a pair of electromagnetic clutches 137 and 138 which I have provided in the system, the cluch 137 being carried on the shaft 117 between the motor 116 and the pump 118, and the clutch 138 being mounted on the shaft 117 between the motor 116 and the fan 119. The clutches 137 and 138 are of the friction type, each including a male member 139 and a female member 141, the members being provided with suitable linings, such as leather. A pair of solenoids 142 and 143 are provided for actuating the clutches 137 and 138 respectively, tho solenoids being connected in the electrical circuit 121. Upon energization of the solenoids, the female members 141 of the clutches are carried into engagement with the male members 139. When the engine is cold, neither the motor 116 nor the solenoids 142 and 143 are energized, and hence neither the pump 118 nor the fan 119 is revolved. When the engine reaches a predetermined temperature, the motor and the solenoids are energized thereby causing the pump and fan to be operated.

If desired, a switch 144 can be interposed in the circuit 121 leading to the solenoid 142 and a switch 146 can be placed in the circuit 121 leading to the solenoid 143, so that either the pump 118 or the fan 119 can be cut out of the system by merely opening either the switch 144 or the switch 146 respectively. An alternate arrangement, whereby the switches 144 and 146 can be dispensed with, can be employed by providing multiple thermostats, one of which is connected in series with the motor 116 and the solenoid 142 and the other of which is connected in series with the motor 116 and the solenoid 143 and a third one of which is connected in series with the motor 116 and both solenoids 142 and 143. These thermostats can be arranged so as to be operable at different predetermined temperatures, whereby the pump can be operated at one predetermined temperature, the fan at another predetermined temperature and both the fan and the pump together can be operated at a third predetermined temperature, see Fig. 2A. Another alternate arrangement for effecting the above result can be utilized by furnishing a step-contact thermostat, the contacts being arranged so that either the pump or the fan alone will be operated upon the engine reaching a predetermined temperature and whereby the pump and the fan together will be operated when the engine reaches a different predetermined temperature, see Fig. 2B.

Another modification of my cooling system is illustrated in Fig. 3 in which an engine 211 is shown to which a radiator 213 for permitting the circulation of cooling water is connected, one of the connections being a conduit 214 through which hot water passes from the engine to the radiator.

In this modification, I provide a suitably mounted shaft 217 on which a water pump 218 and a fan 219 are mounted, the pump preferably being rigidly mounted on the engine. Power is transmitted to the shaft 217 by means of a belt 220 which is connected to a source of power, such as the crank shaft of the engine, not shown, and which also is trained around a pulley 225 mounted on the shaft.

Under certain conditions, such as when the engine is cold or warm, it is desirable that the pump alone or that the pump and fan together will be operative and, accordingly, means are provided for effecting these results. These means include an electrical circuit 221 in which is connected a battery 222, which can be the battery of the engine ignition system, and in which also is connected a thermostat 223 which is similar to the thermostat 23 above described. In this modification, I also connect a switch 233 in the circuit 221 for opening the circuit when desired, the switch which is employed conveniently being the ignition switch of the vehicle.

The means for operating the pump and fan together also include an electromagnetic clutch 238 which preferably is carried on the shaft 217 between the fan 219 and the pulley 225. The clutch 238 preferably is of the friction type and includes a male member 239 and a female member 241, the members being provided with suitable lining, such as leather. A solenoid 243 is provided for actuating the clutch, the solenoid being connected in the circuit 221. Upon energization of the solenoid, the female member 241 is carried into engagement with the male member 239.

When the engine is cold, the water pump 218 alone is revolved for circulating cooling water to the engine. When the engine reaches a predetermined temperature, the thermostat 223 effects a closing of the electrical circuit 221 and the solenoid 243 is energized thereby actuating the clutch 238 and causing the fan 219 to be brought into driving connection with the shaft 217, and, as a result, the pump and fan together are operated.

In Fig. 4 I have illustrated still another modification of my cooling system as applied to an engine 311 which is provided with a radiator 313 connected to the engine, one of the connections being a conduit 314 through which hot water passes from the engine to the radiator. In this modification, in addition to providing a suitably mounted shaft 317 on which a water pump 318 and a fan 319 are mounted, I provide a belt 320 for transmitting power to the shaft, the belt being connected to a source of power, such as the crank shaft of the engine, not shown, and also being wound about a pulley 325 mounted on the shaft.

An electrical circuit 321 is provided in this modification of my cooling system, the circuit including a battery 322, which can be the battery of the ignition system of the engine, and also including a thermostat 323 which is similar to the thermostat 23 hereinabove described. A switch 333, such as the ignition switch of the vehicle, can be connected in the circuit 321 for opening the circuit when desired.

The thermostat 323 is mounted on the engine, and is adapted, upon variations in the temperature of the engine, to control a pair of electromagnetic clutches 337 and 338, the clutch 337 being carried on the shaft 317 between the pump 318 and the pulley 325 and the clutch 338 being carried on the shaft between the pulley 325 and the fan 319. The clutches 337 and 338 are similar to the clutches 137 and 138 hereinabove described, each including a male member 339 and a female member 341 which are suitably lined as with leather. A pair of solenoids 342 and 343 are provided for actuating the clutches 337 and 338 respectively, the solenoids being connected in the electrical circuit 221. When the engine is cold neither the pump nor the fan are revolved. When the engine reaches a predetermined temperature, the thermostat 323 acts to close the circuit 321, the solenoids 342 and 343 are energized thereby causing the pump and the fan to become operative together.

If desired, a switch 344 can be interposed in the circuit 321 leading to the solenoid 342 and a similar switch 346 can be connected in the circuit 321 leading to the solenoid 343 whereby either the pump or the fan can be cut out of the system by opening either the switch 344 or the switch 346 respectively. Alternate arrangements, whereby the switches 344 and 346 can be dispensed with, can be provided for operating either the pump or fan alone or both the pump and fan together, one arrangement being the provision of multiple thermostats, operative at different predetermined temperatures, one of the thermostats being connected in the circuit 321 in series with the solenoid 342, another thermostat being connected in series with the solenoid 343 and a third thermostat being connected in parallel with both of the solenoids, see Fig. 4A. If desired, a step-contact thermostat can be employed instead of multiple thermostats to effect a similar result, see Fig. 4B.

While I have shown the preferred embodiment of my invention in the drawings, it is to be understood that I am not to be limited to the embodiment shown, as my invention, as defined in the appended claims, may be embodied in a plurality of forms.

I claim:

1. A cooling system for use in an internal combustion engine comprising a fan for directing currents of air about said engine, a pump for circulating cooling water through the engine, an electric motor for driving said fan and said pump, and thermoresponsive means on the engine for regulating the operation of said motor.

2. A cooling system for an internal combustion engine comprising a first means for directing currents of air about the engine, a second means for circulating cooling water through the engine, a third means for driving said first and second means, and temperature responsive means on the engine for regulating the period of operation of said first, second and third means.

3. In an internal combustion engine, a cooling system comprising a pump for circulating cooling water through the engine, a cooling fan for the engine, means for driving said pump and said fan independently of one another, and means responsive to variations in the temperature of the engine for regulating the period of operation of either said pump or said fan.

4. A cooling system for an internal combustion engine comprising a fan for directing currents of air about the engine, a pump for circulating cooling water through the engine, a shaft connecting said fan and said pump, a motor in driving connection with said shaft for driving said fan and said pump, a clutch on said shaft between said motor and said fan, a second clutch in said shaft between said motor and said pump, solenoids for actuating said clutches, an electric circuit for said motor and said solenoids, thermoresponsive means in said circuit for regulating the energization of said motor and said solenoids, and means for rendering either of said solenoids ineffective.

In testimony whereof, I have hereunto set my hand.

JOHN R. RIPPE.